(12) United States Patent
  Li (10) Patent No.: US 11,334,780 B2
(45) Date of Patent: May 17, 2022

(54) METHOD FOR GENERATING WORD CODE, METHOD AND DEVICE FOR RECOGNIZING CODES

(71) Applicant: YUESHI NETWORK TECHNOLOGY DEVELOPMENT CO., LTD., Beijing (CN)

(72) Inventor: Baoliang Li, Shanghai (CN)

(73) Assignee: YUESHI NETWORK TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/413,008

(22) PCT Filed: Jan. 23, 2019

(86) PCT No.: PCT/CN2019/072818
§ 371 (c)(1),
(2) Date: Jun. 11, 2021

(87) PCT Pub. No.: WO2020/147140
PCT Pub. Date: Jul. 23, 2020

(65) Prior Publication Data
US 2022/0067469 A1  Mar. 3, 2022

(30) Foreign Application Priority Data
Jan. 17, 2019 (CN) .......................... 201910045595.5

(51) Int. Cl.
*G06K 19/06* (2006.01)
*G06V 30/226* (2022.01)

(52) U.S. Cl.
CPC ... *G06K 19/06103* (2013.01); *G06V 30/2264* (2022.01); *G06V 30/2268* (2022.01)

(58) Field of Classification Search
CPC ......... G06K 19/06103; G06V 30/2268; G06V 30/2264
(Continued)

(56) References Cited
U.S. PATENT DOCUMENTS 3,832,686 A * 8/1974 Bilgutay ............ G06K 7/10881
235/462.49
3,990,043 A * 11/1976 Clark .................... G06V 30/224
400/615.2
(Continued)

FOREIGN PATENT DOCUMENTS

CN      1499357 A      5/2004
CN    101030103 A      9/2007
(Continued)

OTHER PUBLICATIONS

The search report of priority CN application dated Nov. 26, 2019.
(Continued)

*Primary Examiner* — Paultep Savusdiphol
(74) *Attorney, Agent, or Firm* — Yu Gang (57) ABSTRACT

A method for generating word code, a method and device for recognizing codes are provided, and they are falling within the field of machine visual recognition. The method for recognizing word code includes: acquiring an image containing word codes, and recognizing target words therein; splitting the target words according to the same rule, and then recognizing all visual anomaly split sequences, and performing determination on the word codes, if the word codes are generated on the basis of an encoding mechanism designed by a system, directly reading same and performing invoking; otherwise, invoking a pre-inputted target file of the word codes according to target word meaning sequence numbers and visual anomaly sequences numbers corresponding to the word codes.

8 Claims, 3 Drawing Sheets

(58) Field of Classification Search
USPC .......................................................... 235/494
See application file for complete search history.

(56) References Cited

U.S. PATENT DOCUMENTS

2007/0098158 A1* 5/2007 Tapson ................. H04L 9/0662
380/37
2017/0090693 A1 3/2017 Ku et al.

FOREIGN PATENT DOCUMENTS

| | | |
|---|---|---|
| CN | 101098454 A | 1/2008 |
| CN | 101098455 A | 1/2008 |
| CN | 101122916 A | 2/2008 |
| CN | 101763516 A | 6/2010 |
| CN | 101908290 A | 12/2010 |
| CN | 102902968 A | 1/2013 |
| CN | 104867022 A | 8/2015 |
| CN | 104951984 A | 9/2015 |
| CN | 105550279 A | 5/2016 |
| CN | 108830126 A | 11/2018 |
| JP | H07192091 A | 7/1995 |
| JP | H09288715 A | 11/1997 |
| WO | 215004 A2 | 2/2002 |

OTHER PUBLICATIONS

Junjuan Liang; "Chinese Excellent Master's Thesis Full-text Database" Issue 11, Nov. 15, 2009, "Research on Chinese Character Image Recognition Technology Based on Multimedia Multimedia Learning" 1-9, I138-I218.

* cited by examiner

METHOD FOR GENERATING WORD CODE, METHOD AND DEVICE FOR RECOGNIZING CODES

TECHNICAL FIELD

The embodiments of the present disclosure relate to the field of machine visual recognition, and in particular, relates to a method for generating word code, method and device for recognizing codes.

BACKGROUND

With the development of information technology, Quick Response (QR) codes and bar codes (i.e., Universal Product Code symbol) have been widely used due to characteristics such as wide coding range, large information capacity and simple usage mode.

In actual use process, the QR code has the following defects: the QR code is a machine language and can only be recognized by a machine, which means that the use of a QR code will occupy a layout space; the form of a QR code is a black square, and is visually abrupt, and will obviously destroy the reading experience when embedded in an article or print, which not only increases the difficulty in typesetting, but also has high requirements on printing size and display precision; in addition, during use, if no word or other forms of annotations are provided for the QR code, a user is unaware of the intention of the QR code.

The QR code has the described defects, and is easy to be replaced manually, thereby causing various losses and problems.

SUMMARY

In a first aspect, some embodiments of the present disclosure provide a method for generating word code, so that the same words can generate a massive number of word codes with different machine visual features, a word code is fused into a word, and the feature is that the visual form of a word code generated is still a word, so that after machine recognition, target files preset respectively can be invoked, and the meanings can also be read by human eyes, and thus machine recognition and human eye recognition are integrated into one.

The method for generating word code specifically includes:

acquiring target words and a corresponding target file which are inputted by, a user;

splitting each word in the target words on the basis of strokes connecting points, so as to obtain split sequences;

and determining whether the number of the split sequences is sufficient to express characters in the target file, and if the number of the split sequences is sufficient to express the characters, word codes are generated according to a preset encoding mechanism: selecting at least part of the split sequences; performing visual anomaly encoding processing on various attribute values of the at least part of the split sequences to obtain machine visual anomaly features, wherein the machine visual anomaly features are used for directly expressing the characters of the target file, and the machine visual anomaly features corresponds to the characters of the target file;

if the number of the split sequences is not sufficient to express the characters, randomly selecting, from the split sequences, several split sequence elements to perform visual anomaly processing on the attribute values; sequentially recording sequence numbers of split sequence elements which are visual anomaly processed, the recorded sequence numbers are recorded as first sequence numbers, wherein the first sequence numbers can be named as visual anomaly sequence number; splicing pronunciations or acronyms of the words corresponding to the target words with the random numbers, so as to generate second sequence numbers, wherein the second sequence numbers can be named as target word meaning sequence numbers; generating word codes according to the first sequence numbers and second sequence numbers, and creating the relationship between the word codes and the target file.

At least part of the split sequences are elected to perform the visual anomaly encoding on at least one of attribute value of: bolding and thinning at different proportions, color value, brushstrokes and shapes of elements, the adjustment of the attribute values of the split sequences of a word maintaining word readability of a word code; the word codes are generated according to a permutation and combination of different split sequences, wherein different word codes have different machine visual features, and the visual form of the word codes is still a word, so that after scanning the word codes, different target files set respectively can be invoked, and thus machine recognition and human eye recognition are integrated into one.

If the word codes are generated on the basis of an encoding mechanism, directly generating readable word codes on the basis of a rule designed in the system, including a file type and a method for processing the target file, the word codes in the encoding mechanism are still implemented in the split sequences of the words.

wherein performing visual anomaly encoding processing on various attribute values of the at least part of the split sequences to obtain machine visual anomaly features includes: electing at least part of the split sequences to perform the visual anomaly encoding on at least one of attribute value of: bolding and thinning at different proportions, color value, brushstrokes and shapes of elements.

wherein randomly selecting, from the split sequences, several split sequence elements to perform visual anomaly processing on the attribute values includes: sequentially recording sequence numbers of split sequence elements processed anomalously; combining the first sequence numbers and the second sequence numbers, to generate the word code sequence number; establishing correlations between the word code sequence numbers and the word codes, and establishing correlations between the word code sequence numbers and the target file corresponding to the word codes.

In some other embodiments of the present disclosure, recognizing each word in the target words, and if the words of different languages can be split on the basis of a stroke rule, splitting the words according to the stroke rule; and if the words cannot be split on the basis of the stroke rule, analyzing stroke connecting points of the words, and splitting same on the basis of connecting points, the system maintaining word code reading with the same splitting rule.

In some other embodiments of the present disclosure, the method further includes: generating target word meaning sequence number according to the target words.

Correspondingly, randomly selecting, from the split sequences, several split sequence elements to perform visual anomaly processing so as to generate word codes further includes: sequentially recording, as visual anomaly sequence numbers, sequence numbers of split sequence elements subjected to the visual anomaly processing; according to word code sequence numbers generated by the target word meaning sequence number and the visual anomaly sequence numbers, establishing correlations between the word code sequence numbers, and the word codes and the target file corresponding to the word codes respectively; and if the word codes are generated on the basis of the encoding mechanism, directly generating readable word codes on the basis of the encoding mechanism designed in the system.

In a second aspect, some embodiments of the present disclosure provide a device for generating word code, the device includes a processor coupled with a memory, and the processor is configured to execute programming instructions by the following programming units stored in the memory: a target acquisition module, configured to acquire target words and a corresponding target file which are inputted by a user, and trigger a target splitting module; the target splitting module, configured to split each word in the target words on the basis of strokes connecting points, so as to obtain split sequences, and trigger a word code generation module; and the word code generation module, the word code generation module, configured to generate word codes on the basis of an encoding mechanism in cases where the number of the split sequences is sufficient to express characters in the target file, select some split sequences to add visual anomaly features, and directly express characters, file type of the corresponding target file on the basis of the encoding mechanism designed by a system; and randomly select, from the split sequences, several split sequence elements to perform visual anomaly processing in cases where the number of the split sequences is insufficient to express characters in the target file, so as to generate word codes, establish correlations between the word codes and the target file on the basis of a sequence number rule of the system, and output the word codes.

In a third aspect, some embodiments of the present disclosure provide a method for recognizing word code, including: acquiring an image containing word codes, and recognizing target words corresponding to the word codes; splitting each word in the target words on the basis of strokes connecting points, so as to obtain word code split sequences; recognizing visual anomaly sequences from the word code split sequences; and determining whether the word codes are generated on the basis of an encoding mechanism designed by a system, and if the word codes are generated on the basis of an encoding mechanism designed by a system, directly reading the word codes and performing target file invoking; if the word codes are not generated on the basis of an encoding mechanism designed by a system, invoking a preset target file corresponding to the word codes according to second sequence numbers corresponding to the target words and the first sequence numbers.

In a fourth aspect, some embodiments of the present disclosure provide a device for recognizing word code, including:

a target words recognition module, configured to acquire an image containing word codes, recognize target words corresponding to the word codes, and trigger a word code splitting module;

the word code splitting module, configured to split each word in the target words on the basis of stroke connecting points, so as to obtain word code split sequences, and trigger an visual anomaly recognition module;

the visual anomaly recognition module, configured to recognize visual anomaly sequences from the word code split sequences and trigger a target file invoking module; and the word code generation module, configured to generate word codes on the basis of an encoding mechanism in cases where the number of the split sequences is sufficient to express characters of the target file, select some split sequences to add visual anomaly features, and directly express characters of the corresponding target file on the basis of the encoding mechanism designed by a system; and randomly select, from the split sequences, several split sequence elements to perform visual anomaly processing in cases where the number of the split sequences is insufficient to express characters of the target file, so as to generate word codes, establish a correlation between the word codes and the target file on the basis of second sequence numbers and first sequence numbers, and output the word codes.

In a fifth aspect, some embodiments of the present disclosure provide word codes, wherein the word codes include target words subjected to visual anomaly processing;

the target words subjected to visual anomaly processing are used for expressing a set target file;

the target words are used for generating target word meaning sequence number;

the target words subjected to visual anomaly processing include visual anomaly elements;

the visual anomaly elements are used for generating visual anomaly sequence numbers; and the target word meaning sequence number and the visual anomaly sequence numbers are used for generating word code sequence numbers, so as to acquire a pre-stored target file corresponding to the word code sequence numbers.

In a sixth aspect, some embodiments of the present disclosure provide a computer-readable storage medium, wherein the computer-readable storage medium has a program stored therein, and the program is used for implementing the method for generating word code as described above.

In a seventh aspect, some embodiments of the present disclosure provide a computer-readable storage medium, wherein the computer-readable storage medium has a program stored therein, and the program is used for implementing the method for recognizing word code as described above.

The embodiments of the present disclosure have the following advantages:

the visual form of a word code is a word, and the same words can generate a massive number of word codes with different machine visual meanings, so that after scanning, the word codes can be read and different target files preset respectively can be invoked, and the meanings of the word codes can also be expressed, and thus machine recognition and human eye recognition are integrated into one.

Compared with a QR code requiring words and various annotations, having a form of an abrupt black square, and causing obvious feeling of foreign matter when embedded in an article or print, the word codes can expand information and connection services for a user while keeping smooth reading in various word scenarios.

In addition, word codes are fused into a word structure, facilitating typesetting, and are difficult to be replaced manually after being used. Human eye recognition and machine recognition are integrated into one, which means that it is unnecessary to use a scan code for achieving a scanning function, which consumes additional layout resources.

In practical application scenarios, for example, if a word code region of six Chinese characters of "操作说明视频" [operation instruction video] in prints of different manufacturers is scanned, operation instruction video links of specific products set by billions of different manufacturers respectively can be opened, so that a user can perform expanded reading and connections very conveniently, and corresponding target files can be updated on-line constantly. For example, if scanning different words of the same child's book, different links can be opened to perform knowledge query and expansion, and so on.

In some embodiments of the present disclosure, in a way of opening target files corresponding to words on the basis of target word meaning sequence number and visual anomaly sequence numbers, level-by-level recognition can greatly avoid the occurrence of recognition errors at the first stage, without being limited by the complexity of resource identifiers of target files.

BRIEF DESCRIPTION OF THE DRAWINGS

In the figures, 801 represents a target words recognition module, 802 represents a word code splitting module, 803 represents an visual anomaly recognition module, and 804 represents a target file invoking module.

DETAILED DESCRIPTION OF THE EMBODIMENTS

The following embodiments are used for illustrating the present disclosure, but do not limit the scope of the present disclosure.

A word code is fused into a word structure, and the visual form thereof is still a word, so that machine recognition and human eye recognition are integrated into one while the human eye recognition of a word is not destroyed.

Figure 1:
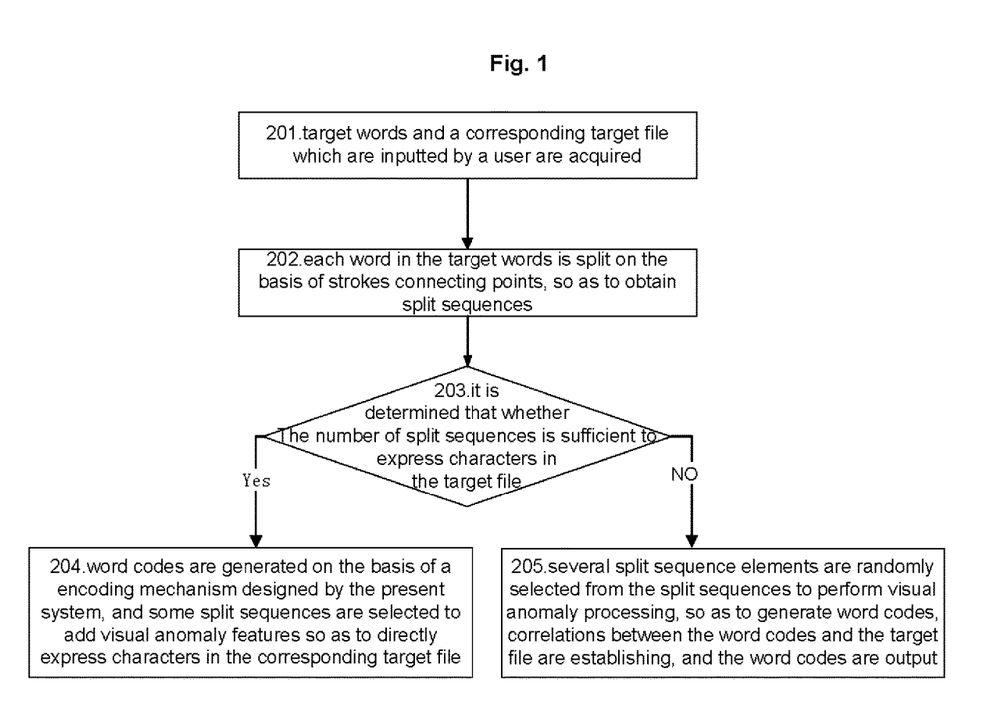
FIG. 1 is a flowchart of a method for generating word code according to some embodiments of the present disclosure.

In a first aspect of some embodiments of the present disclosure, a method for generating word code is provided. As shown in FIG. 1, the method for generating word code includes:

step 201: target words and a corresponding target file which are inputted by a user are acquired.

In the embodiments of the present disclosure, the target words and target file which are inputted by the user are acquired, and the acquired target file is recognized, wherein the target file may be a uniform resource identifier (URI), and may also be image information, audio information, text information, video information and account information, and various types of target files.

A system automatically performs validity verification, and if it is determined, upon verification, that the pre-inputted target file can be opened after the word codes are read, then the word codes are outputted for the user to use, and the user can select different sizes and formats; otherwise, the user is prompted to input a valid target file so as to regenerate word codes.

In cases where the target file is recognized as at least one of image information, audio information, text target file, and if it is determined that the format or type of the target file is readable, then the target file is stored; otherwise, the user is prompted to re-input a file with a recognizable format or type.

Further, when the target words and the corresponding target file are acquired, said method further includes: generating a set of random numbers, and generating target word meaning sequence number according to the random numbers in a preset way and storing same, specifically, pronunciations or acronyms of the words corresponding to the target words are spliced with the random numbers, so as to generate the target word meaning sequence number. The target word meaning sequence number are used to identify the current target words.

For example, when the target words and corresponding target file which are inputted by the user are acquired, and the target words are recognized, it is recognized that the target words are Chinese characters "我的词组" [my words]; and when the target file is recognized, it is recognized that the target file is uniform resource identifier (URI).

Still further, the acquired target words inputted by the user can be visual anomaly arrangement of the target words performed by the user on his/her own according to a preset rule; correspondingly, when the system acquires the target words, it is only necessary to perform determination on the target words, and if it is determined that the target words are usable, word codes are generated; otherwise, the user is prompted to set it as not usable.

Step 202: each word in the target words is split on the basis of strokes connecting points, so as to obtain split sequences.

In the embodiments of the present disclosure, a method for splitting each word in the target words on the basis of strokes connecting points includes:

each word in the target words is recognized, and in cases where the recognized words can be split on the basis of a stroke rule, the words are split according to the stroke rule; otherwise, connecting points of the words are analyzing, the words are split on the basis of the connecting points, and elements obtained after the splitting are taken as split sequences. Further, according to the split sequences, stroke sequence numbers of the elements in the split sequences are established as split sequence numbers.

Taking the target words being Chinese characters "我的词组"[my words] as an example for illustration: according to Chinese character stroke rule, "我的词组" is split according to strokes, and sequence numbers are sequentially established for the strokes, wherein the stroke sequence number for "丿" in Chinese character "我" is 1, the stroke sequence number for " ﹒ " in Chinese character "我" is 2, the stroke sequence number for "丨" in Chinese character "我" is 3, and the stroke sequence number for "丶" in Chinese character "我" is 4, the stroke sequence number for "乀" in Chinese character "我" is 5, the stroke sequence number for "丿" in Chinese character "我" is 6, the stroke sequence number for "丶" in Chinese character "我" is 7, the stroke sequence number for "丿" in Chinese character "的" is 8, and the stroke sequence number for "丨" in Chinese character "的" is 9; according to this method, i.e., Chinese character stroke rule, the strokes in "我 的词组" are sequentially split and corresponding stroke sequence numbers are established.

The number of strokes of the four Chinese characters "我的词组" is 30, and the number of different word codes which can be generated is far greater than the number of all mobile phone numbers in China. When performing one type of visual anomaly processing (for example, bolding at a single proportion) on different combinations of stroke sequences, if the stroke subjected to the visual anomaly processing is n, and thus $C_{30}^n$ different "我的词组" can be generated, that is, a large number of $C_{30}^n$ word codes are generated. The $C_{30}^n$ word codes can correspond to target files such as $C_{30}^n$ links and open same after being recognized. The system selects different sequence numbers less than n to generate different word codes, and mixes different bolding proportions and different attribute values, such that the same words can generate a large number of word codes with different machine visual features, thereby achieving the invoking of target files respectively set when scanning the same words. For example, if scanning the same words "张记面 馆" [Zhang's noodle restaurant] of different merchants in different regions, various target files such as links, account information and contents set by different merchants with names of "张记面馆" can be acquired.

Taking English letters "My Phrase" being target words as an example for illustration: analyzing connecting points of the English letters, splitting the connecting points on the basis of a rule, sequentially establishing split sequence numbers, and using the split sequence numbers and corresponding parts obtained by splitting as elements to form split sequences. By analogy, operations for languages and words of other countries are performed.

In the embodiments of the present disclosure, if it is detected that the number of elements in the split sequences corresponding to the target words inputted by a user is less than a preset value, methods of mixing multiple visual anomaly processing, increasing the number of split sequences, and different visual anomaly ways being superimposed regarding the same split sequence can be used, so as to expand different word codes which can be generated. If the word code corresponding to a special word is unavailable, the system will automatically prompt the user to increase the number of words so as to expand the number of combinations of word code sequence numbers.

Step 203: it is determined that whether the number of split sequences is sufficient to express characters in the target file, and if so, step 204 is executed; otherwise, step 205 is performed.

Step 204: word codes are generated on the basis of an encoding mechanism designed by the present system, and some split sequences are selected to add visual anomaly features so as to directly express characters in the corresponding target file.

In the embodiments of the present disclosure, by means of determining whether the number of the split sequences is sufficient to express characters in the target file so as to select and generate word codes, in cases where it is determined that the number of the split sequences is sufficient to express characters in the target file, the word codes are generated on the basis of an encoding mechanism; and in cases where it is determined that the number of the split sequences is insufficient to express characters in the target file, the word codes are generated on the basis of the sequence numbers.

In some embodiments of the present disclosure, a word code generation mechanism selected by a user can also be acquired, and word codes are generated on the basis of the word code generation mechanism selected by the user. User-selectable word code generation mechanisms include a mechanism for generating word codes on the basis of an encoding mechanism and a mechanism for generating word codes on the basis of sequence numbers. In cases where the word codes are generated on the basis of an encoding mechanism selected by a user, the number of split sequences also needs to be determined, and in cases where the number of the split sequences is sufficient to express characters in the target file, the word codes are generated on the basis of the encoding mechanism; otherwise, the user is prompted to generate word codes on the basis of the sequence numbers.

Step 205: several split sequence elements are randomly selected from the split sequences to perform visual anomaly processing, so as to generate word codes, correlations between the word codes and the target file are establishing, and the word codes are output.

In the embodiments of the present disclosure, at least one element is randomly selected from the split sequences and is subjected to visual anomaly processing, so as to obtain a processed element; the processed element and other elements in the split sequences are recombined into target words according to split sequence numbers, so as to obtain word codes; and correlations are established between the word codes and the target file, so that when the word codes are triggered, the target file associated therewith can be acquired.

When several split sequence elements are randomly selected from the split sequences and are subjected to visual anomaly processing, said method further includes: acquiring all elements subjected to the visual anomaly processing, acquiring split sequence numbers of the elements, generating visual anomaly sequence numbers according to the split sequence numbers of the elements in a preset way, generating word code sequence numbers according to the visual anomaly sequence numbers and target word meaning sequence number, establishing correlations between the word code sequence numbers, the word codes and the target file, and storing the word code sequence numbers. Further, in order to ensure the uniqueness of the word codes and corresponding target file, the generating method in some embodiments of the present disclosure further includes: automatically avoiding word code sequence numbers and processing ways already existing, so as to avoid repetition.

In the embodiments of the present disclosure, the visual anomaly processing ways include, but are not limited to, adjusting at least one of attribute values of thickness (for example, bolding and thinning at different proportions), brushstrokes, form, color value, and shape. Still further, during the visual anomaly processing, attribute values corresponding to the visual anomaly processing ways may also be set, so that different attribute values are used regarding the same visual anomaly processing way, and the generated word code sequence numbers are different. For example, on the basis of the same target words, when the same element in the split sequences is subjected to bolding processing at different bolding proportions, the generated word code sequence numbers are different.

By means of multi-dimensional processing of various attribute values of thickness, stroke, color value and shape of elements, the number of word code sequence numbers is increased, and the number of word codes which can be generated on the basis of the same target words is the number of combinations of all split sequences. Different visual anomaly processing ways can be mixed, greatly improving the number of combinations, that is, the same target words can generate word codes with different features.

Further, in cases where correlations are established between the word codes and the target file, said generating method further includes: the word codes are scanned so as to detect whether a set target file can be acquired, and if it is verified that the target file can be acquired, the word codes are output; otherwise, the current step is returned to regenerate word codes.

In some embodiments of the present disclosure, in a way of opening target files corresponding to words on the basis of target word meaning sequence number and visual anomaly sequence numbers, level-by-level recognition has the advantage of being able to greatly avoiding the occurrence of recognition errors at the first stage, and after word codes are generated, the background can automatically and immediately scan and verify whether a set target file can be opened, so as to ensure and increase the accuracy rate of recognition.

Figure 2:
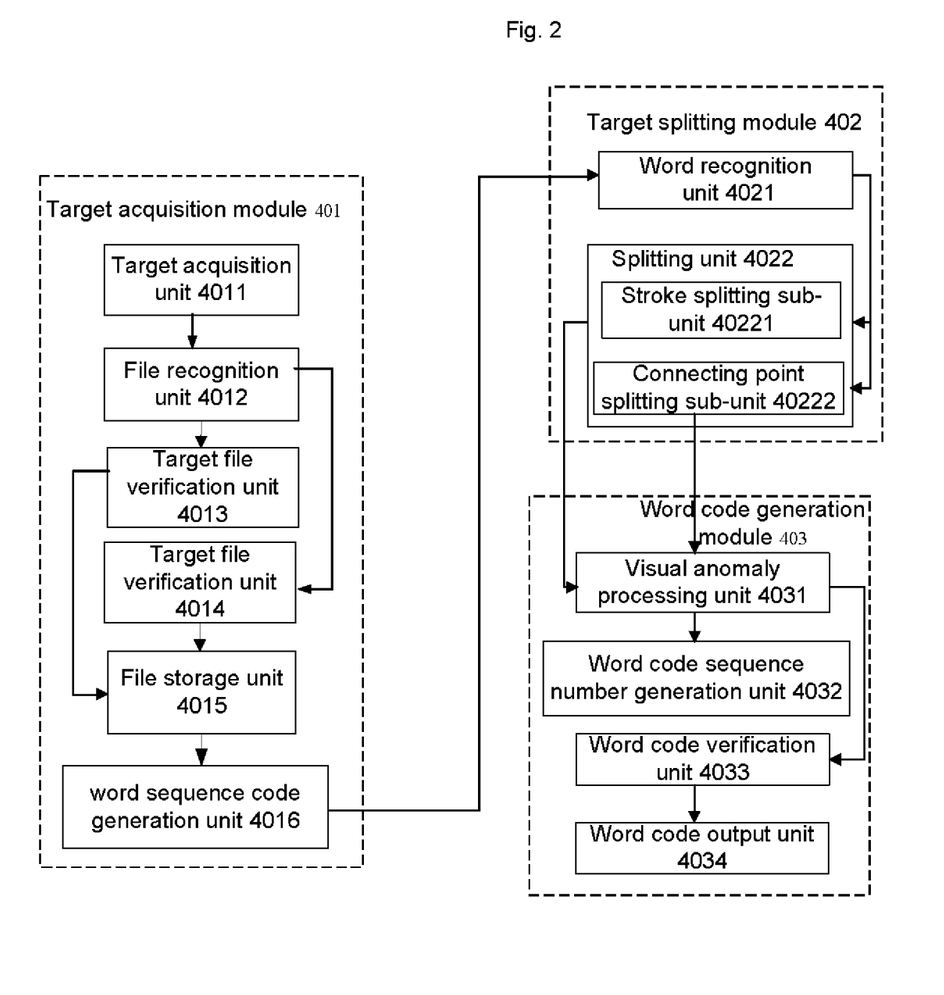
FIG. 2 is a structural diagram of a device for generating word code according to some other embodiments of the present disclosure.

In a second aspect of some embodiments of the present disclosure, a method for generating word code is provided. As shown in FIG. 2, said device includes:

a target acquisition module 401, configured to acquire target words and a corresponding target file which are inputted by a user, and trigger a target splitting module 402.

In some embodiments of the present disclosure, the target acquisition module 401 includes:

a target acquisition unit 4011, configured to acquire the target words and corresponding target file inputted by the user, and trigger a file recognition unit 4012;

the file recognition unit 4012, configured to recognize the target file, and trigger a target file verification unit 4013 in cases where the recognized target file is a uniform resource identifier (URI), and trigger a readability verification unit 4014 in cases where the recognized target file is not a uniform resource identifier (URI);

the target file verification unit 4013, configured to verify the validity of the target file in cases where the target file is recognized, trigger a file storage unit 4015 when it is determined that the target file is valid and can be opened, and prompt the user to input a valid target file when it is determined that the target file is invalid;

the readability verification unit 4014, configured to recognize the format or type of the target file in cases where the recognized target file is not a uniform resource identifier URI, perform readability verification on the target file according to the format or type, trigger the file storage unit 4015 when it is determined that the target file is readable, and prompt the user to re-input a file having a recognizable format or type when it is determined that the target file is not readable; and the file storage unit 4015, configured to store the target file.

Further, the target acquisition module 401 further includes:

a target word meaning sequence number generation unit 4016, connected to the file storage unit 4015, and configured to generate a set of random numbers, generate target word meaning sequence number according to the random numbers in a preset way and store same, specifically, pronunciations or acronyms of the words corresponding to the target words are spliced with the random numbers, so as to generate the target word meaning sequence number. The target word meaning sequence numbers are used to identify the current target words.

The target splitting module 402 is configured to split words in the target words on the basis of strokes connecting points, so as to obtain split sequences, and trigger a word code generation module 403.

In the embodiments of the present disclosure, the target splitting module 402 includes:

a word recognition unit 4021, configured to recognize target words and trigger a splitting unit 4022; and the splitting unit 4022, configured to split words according to a stroke rule in cases where the recognized words can be split on the basis of the stroke rule, so as to obtain split sequences, and further configured to analyze connecting points of the words and split the connecting points in cases where the recognized words cannot be split on the basis of the stroke rule, so as to obtain split sequences.

Further, the splitting unit 4022 specifically includes:

a stroke splitting sub-unit 40221, configured to split strokes of the target words according to the stroke rule in cases where the recognized words can be split on the basis of the stroke rule, sequentially establish split sequence numbers for the strokes, and use the split sequence numbers and corresponding strokes as elements to form split sequences; and a connecting point splitting sub-unit 40222, configured to analyze connecting points of the words and split the connecting points in cases where the recognized words cannot be split on the basis of the stroke rule, sequentially establish split sequence numbers for the parts obtained by splitting, and use the split sequence numbers and corresponding parts obtained by splitting as elements to form split sequences.

The word code generation module 403 is configured to generate word codes on the basis of an encoding mechanism in cases where the number of the split sequences is sufficient to express characters in the target file, select some split sequences to add visual anomaly features, and directly express characters in the corresponding target file; and randomly select, from the split sequences, several split sequence elements to perform visual anomaly processing in cases where the number of the split sequences is insufficient to express characters in the target file, so as to generate word codes, establish correlations between the word codes and the target file, and output the word codes.

In the embodiments of the present disclosure, the word code generation module 403 includes:

an visual anomaly processing unit 4031, configured to randomly select at least one element from the split sequences and perform visual anomaly processing, so as to obtain a processed element, and recombine the processed element with other elements in the split sequences into target words, so as to obtain word codes; and a word code sequence number generation unit 4032, connected to the visual anomaly processing unit 4031 and configured to acquire all elements subjected to visual anomaly processing and acquire split sequence numbers of the elements, generate visual anomaly sequence numbers according to the split sequence numbers of the elements in a preset way, and generate word code sequence numbers according to the visual anomaly sequence numbers and the target word meaning sequence number in cases where the number of the split sequences is insufficient to express characters in the target file; and further configured to determine whether the word code sequence numbers already exist, and in cases where the word code sequence numbers already exist, trigger the visual anomaly processing unit 4031, so as to re-split the target words; and establish correlations between the word code sequence numbers, the word codes and the target file in cases where there are no word code sequence numbers, and store the word code sequence numbers.

In the embodiments of the present disclosure, the word code generation module further includes: a word code generation unit, configured to generate word codes on the basis of an encoding mechanism in cases where the number of the split sequences is sufficient to express characters in the target file, select some split sequences to add visual anomaly features, and directly express characters in the corresponding target file;

a word code verification unit 4033, connected to the visual anomaly processing unit 4031 and a word code output unit 4034, and configured to scan word codes in cases where the visual anomaly processing unit 4031 generates word codes, detect whether a target file can be acquired, and trigger the word code output unit 4034 if the target file is acquired within a preset time, and otherwise, trigger the visual anomaly processing unit 4031 to regenerate word codes; and the word code output unit 4034, configured to output the word codes.

Moreover, when a word code file is outputted, a human eye recognition tag is added thereto, so as to indicate that the file can be scanned, the output size is defined and the specification is selected, visual anomaly features of small-size word codes are increased so as to maintain the identifiability thereof, and a user can select to re-output or select a customized style.

Figure 3:
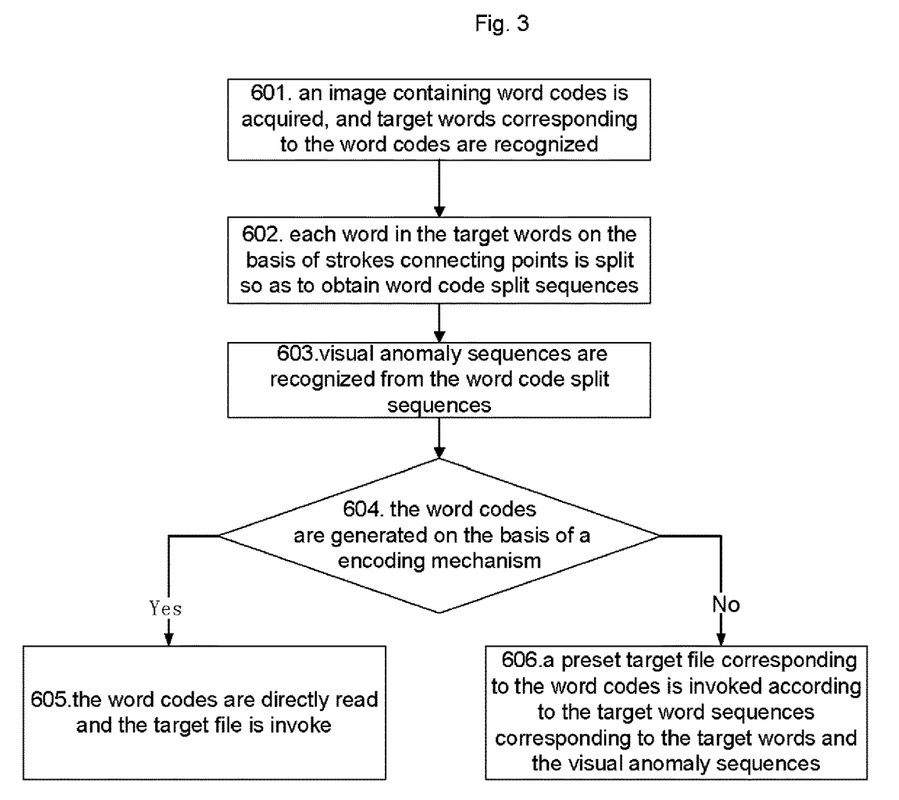
FIG. 3 is a flowchart of a method for recognizing word code according to some other embodiments of the present disclosure.

In a third aspect of some embodiments of the present disclosure, a method for recognizing word code is provided. As shown in FIG. 3, the recognizing method includes:

step 601: an image containing word codes is acquired, and target words corresponding to the word codes are recognized.

In the embodiments of the present disclosure, the image containing word codes can be acquired by means of scanning, and target words corresponding to the word codes are recognized therefrom.

Step 602: each word in the target words on the basis of strokes connecting points is split so as to obtain word code split sequences.

In the embodiments of the present disclosure, in cases where each word in the target words is recognized and the recognized words can be split on the basis of a stroke rule, strokes of the words are split according to the stroke rule, split sequence numbers are sequentially established for the strokes, and the split sequence numbers and corresponding strokes are used as elements to form word code split sequences; and in cases where the recognized words cannot be split on the basis of the stroke rule, connecting points of the words are analyzed and the connecting points are split, split sequence numbers are sequentially established for the parts obtained by splitting, and the split sequence numbers and corresponding parts obtained by splitting are used as elements to form word code split sequences.

Step 603: visual anomaly sequences are recognized from the word code split sequences.

In the embodiments of the present disclosure, standard word attributes of target words in the current environment are acquired; and determination is performed on the word code split sequences according to the standard word attributes, split sequence elements different from the standard word attributes are screened and defined as visual anomaly elements, and the visual anomaly attributes of the visual anomaly elements are sequentially recorded.

Further, the recognizing method further includes, before performing visual anomaly recognition on the word code split sequences: during use, calculating the inclination angles of word codes on the basis of stroke projection, and automatically compensating each stroke of the word codes according to the calculation result, so as to avoid, when scanning word codes, the deformation of a collected word code image due to the inclination angle between an image collection device and the word codes (for example, when the word codes are scanned in a forward inclination way, the word code image acquired by scanning will have a width reducing from top to bottom), thereby causing errors or even failed recognition in the visual anomaly recognition of word codes.

Step 604: it is determined whether the word codes are generated on the basis of an encoding mechanism, and if so, performing step 605; otherwise, performing step 606.

In the embodiments of the present disclosure, visual anomaly sequence elements at predetermined positions in the visual anomaly sequences are acquired, and it is determined, according to the visual anomaly sequence elements at the predetermined positions, whether the word codes are generated on the basis of an encoding mechanism.

Step 605: the word codes are directly read and the target file is invoked.

In the embodiments of the present disclosure, in cases where there are many split sequences of target words, which are sufficient as a target file of an official account or a network address, the word codes are generated on the basis of an encoding mechanism, so that there is no need to store the target files in a central server, reducing resources while being more convenient to read word codes and invoke a target file.

Step 606: a preset target file corresponding to the word codes is invoked according to the target word sequences corresponding to the target words and the visual anomaly sequences.

In the embodiments of the present disclosure, visual anomaly sequence numbers can be generated according to split sequence numbers of the visual anomaly elements, word code sequence numbers can be generated according to the visual anomaly sequence numbers and the target word meaning sequence number, a target file corresponding to the word code sequence numbers can be acquired, and the target file can be invoked.

Further, the recognizing method further includes, when generating the word code sequence numbers: determining whether the word code sequence numbers already exist, if so, acquiring a target file corresponding to the word code sequence numbers, invoking the target file, and ending; otherwise, prompting that the word is not a word code, and ending.

Figure 4:
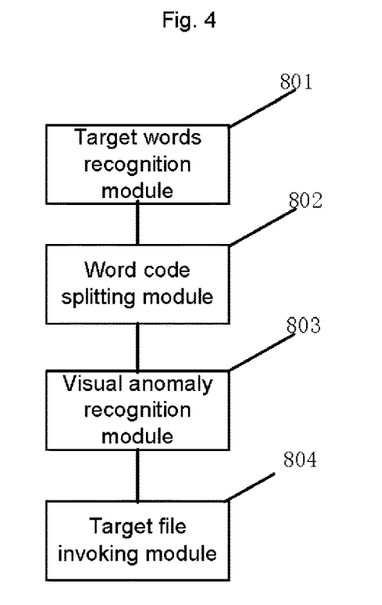
FIG. 4 is a structural diagram of a device for recognizing word code according to some other embodiments of the present disclosure.

In a fourth aspect of some embodiments of the present disclosure, a device for recognizing word code is provided. As shown in FIG. 4, the recognizing device includes:

a target words recognition module 801, configured to acquire an image containing word codes, recognize target words corresponding to the word codes, and trigger a word code splitting module 802.

In the embodiments of the present disclosure, the target words recognition module 801 is configured to acquire an image containing word codes by means of scanning, recognize target words corresponding to the word codes, and trigger the word code splitting module 802.

The word code splitting module 802 is configured to split each word in the target words on the basis of strokes connecting points, so as to obtain word code split sequences, and trigger an visual anomaly recognition module 803.

In the embodiments of the present disclosure, the word code splitting module 802 is configured to split strokes of words according to a stroke rule, sequentially establish split sequence numbers for the strokes, use the split sequence numbers and corresponding strokes as elements to form word code split sequences, and trigger the visual anomaly recognition module 803 in cases where each word in the target words is recognized and the recognized words can be split on the basis of the stroke rule; and analyze connecting points of the words and split the connecting points, sequentially establish split sequence numbers for the parts obtained by splitting, use the split sequence numbers and corresponding parts obtained by splitting as elements to form word code split sequences, and trigger the visual anomaly recognition module 803 in cases where the recognized words cannot be split on the basis of the stroke rule.

The visual anomaly recognition module 803 is configured to recognize visual anomaly sequences from the word code split sequences and trigger a target file invoking module 804.

In the embodiments of the present disclosure, the visual anomaly recognition module 803 is configured to acquire standard word attributes of target words in the current environment, perform determination on the word code split sequences according to the standard word attributes, screen elements different from the standard word attributes and define same as visual anomaly elements, and sequentially record the sequences thereof.

The target file invoking module 804 is configured to determine whether the word codes are generated on the basis of an encoding mechanism, and if so, directly reading same, and invoking a target file; otherwise, invoke a preset target file corresponding to the word codes according to the target word sequences corresponding to the target words and the visual anomaly sequences.

In the embodiments of the present disclosure, the target file invoking module 804 is configured to directly read word codes and invoke a target file in cases where the word codes are generated on the basis of an encoding mechanism designed by a system; and generate visual anomaly sequence numbers according to split sequence numbers of the visual anomaly elements, generate word code sequence numbers according to the visual anomaly sequence numbers and the target word meaning sequence number, acquire target file corresponding to the word code sequence numbers, and invoke the target file in cases where the word codes are generated on the basis of the sequence numbers.

Further, the target file invoking module 804 is further configured to, when generating the word code sequence numbers: determine whether the word code sequence numbers already exist, if so, acquire a target file corresponding to the word code sequence numbers, invoke the target file, and end; otherwise, prompt that the word is not a word code, and end.

In the embodiments of the present disclosure, a method for generating and reading word codes on the basis of a coding rule, i.e., an encoding mechanism, designed by a system is provided. With regard to the situation that the word code split sequences are sufficient to express a target file, a parallel word code direct-generation mechanism in the system can be selected for implementation, wherein the word code generation method includes: splitting all words of the target words on the basis of stroke nodes; and the split sequences sequentially corresponding to common characters on the basis of specified visual anomaly features, including bolding at different proportions, shapes and various different attribute values, so as to express a set target file. The system can customize some split sequences to express directly-read word codes and some sequences to express the type of the target file invoked after reading the word codes. For example, after a word is split on the basis of stroke nodes, regarding the split sequences, the first stroke being bolded by 10%, represented by letter a; the first stroke being bolded by 20%, represented by letter b; and the first stroke being bolded by 30%, represented by letter c. By analogy, encoding mechanism arrangement is finished, so that each split sequence can express and correspond to different characters on the basis of a coding rule by using combinations of various visual anomaly ways on attribute values of bolding, stroke, thinning, and shape. If characters to be expressed are too long, the system can increase the split sequences and visual anomaly points on the split sequences so as to accommodate more information; this mechanism maintains the font.

The method for recognizing word code includes: performing direct reading on the basis of an encoding mechanism, i.e., a coding rule, formulated in the system; and when recognizing target word codes, the system automatically enabling the word code recognition mechanism, and sequentially recognizing visual anomaly features of all split sequences, thereby being able to read a target file.

In a fifth aspect of some embodiments of the present disclosure, word codes are provided, wherein the word codes include target words subjected to visual anomaly processing;

the target words are used for generating target word meaning sequence number;

the target words subjected to visual anomaly processing are used for expressing a set target file;

the target words subjected to visual anomaly processing include visual anomaly elements;

the visual anomaly elements are used for generating visual anomaly sequence numbers; and the target word meaning sequence number and the visual anomaly sequence numbers are used for generating word code sequence numbers, so as to acquire a target file corresponding to the word code sequence numbers.

In the embodiments of the present disclosure, the feature of a word code is implemented on the basis of processing on attribute values of split sequences of each word in the words, and the word code is fused to a word structure, so that the same words can generate a massive number of word codes with different machine visual features, and different target files respectively set can be invoked after scanning word codes, and expressions of word meanings are also integrated, thereby providing an information connection service for a user, without destroying the human eye identifiability of the word; in addition, the word codes appear still as readable words, which means that an additional machine recognition code occupying a layout resource is no longer needed, and thus human eye recognition and machine recognition are integrated into one.

Different from ways such as a QR code and other codes, the word codes merely appear in the form of words, and have the advantages that the word codes can be scanned and read by a machine and a corresponding target file can be invoked, and the meanings of the words themselves can also be expressed, and thus the word codes can be smoothly embedded in articles, videos, pictures, prints or outdoor scenes.

In a sixth aspect of some embodiments of the present disclosure, a computer-readable storage medium is provided, wherein the computer-readable storage medium has a program stored therein, and the program is used for implementing the method for generating word code as described above.

In a seventh aspect of some embodiments of the present disclosure, a computer-readable storage medium is provided, wherein the computer-readable storage medium has a program stored therein, and the program is used for implementing the method for recognizing word code as described above.

Although the present disclosure has been described in detail with reference to the general description and specific embodiments hereinabove, it would have been obvious for a person skilled in the art that modifications and improvements can be made on the basis of the present disclosure. Therefore, these modifications or improvements made without departing from the spirit of the present disclosure all belong to the scope of protection of the present disclosure.

What claimed is:

1. A method for generating word code, comprising:
acquiring target words and a corresponding target file which are inputted by a user;
splitting each word in the target words on the basis of stroke connecting points to obtain split sequences;
determining whether the number of the split sequences is sufficient to express characters in the target file;
if the number of the split sequences is sufficient to express the characters, generating word codes according to a preset encoding mechanism: selecting at least part of the split sequences; performing visual anomaly encoding processing on various attribute values of the at least part of the split sequences to obtain machine visual anomaly features, wherein the machine visual anomaly features are used for directly expressing the characters of the target file, and the machine visual anomaly features corresponds to the characters of the target file;
if the number of the split sequences is not sufficient to express the characters, randomly selecting, from the split sequences, several split sequence elements to perform visual anomaly processing on the attribute values;
sequentially recording sequence numbers of split sequence elements which are visual anomaly processed, the recorded sequence numbers are records as first sequence numbers;
splicing pronunciations or acronyms of the words corresponding to the target words with the random numbers, so as to generate second sequence numbers;
generating word codes according to the first sequence numbers and second sequence numbers, and creating the relationship between the word codes and the target file.

2. The method as claimed in claim 1, wherein generating the word codes according to a permutation and combination of different split sequences, wherein different word codes have different machine visual features, and the visual form of the word codes is still a word.

3. The method as claimed in claim 1, wherein performing visual anomaly encoding processing on various attribute values of the at least part of the split sequences to obtain machine visual anomaly features comprises:
electing at least part of the split sequences to perform the visual anomaly encoding on at least one of attribute values of: bolding and thinning at different proportions, color value, brushstrokes and shapes of elements.

4. The method as claimed in claim 1, wherein randomly selecting, from the split sequences, several split sequence elements to perform visual anomaly processing on the attribute values comprises:
sequentially recording sequence numbers of split sequence elements processed anomalously;
combining the first sequence numbers and the second sequence numbers, to generate the word code sequence number; establishing correlations between the word code sequence numbers and the word codes, and establishing correlations between the word code sequence numbers and the target file corresponding to the word codes.

5. The method as claimed in claim 4, wherein if the word codes are generated on the basis of the encoding mechanism, generating readable word codes directly on the basis of a rule designed in the system; the word codes in the encoding mechanism are still implemented in a word framework.

6. The method as claimed in claim 1,
wherein split sequences of different combinations are selected for combination, or attribute values of different combinations are selected for combination; wherein the same words generate word codes with different machine visual meanings.

7. A method for recognizing word code, comprising:
acquiring an image containing word codes, and recognizing target words corresponding to the word codes;
splitting each word in the target words on the basis of stroke connecting points, so as to obtain word code split sequences;
recognizing visual anomaly sequences from the word code split sequences; and
determining whether the word codes are generated on the basis of an encoding mechanism designed by a system, and if the word codes are generated on the basis of an encoding mechanism designed by a system, directly reading the word codes and performing target file invoking; if the word codes are not generated on the basis of an encoding mechanism designed by a system, invoking a preset target file corresponding to the word codes according to the first sequence numbers and second sequence numbers, which are corresponding to the target words;
wherein the first sequence numbers and second sequence numbers are determined through the following process:
sequentially recording sequence numbers of split sequence elements which are visual anomaly processed, the recorded sequence numbers are records as the first sequence numbers;
splicing pronunciations or acronyms of the words corresponding to the target words with the random numbers, so as to generate second sequence numbers.

8. A device for recognizing word code, comprising:
a target words recognition module, configured to acquire an image containing word codes, recognize target words corresponding to the word codes, and trigger a word code splitting module;
the word code splitting module, configured to split each word in the target words on the basis of stroke connecting points, so as to obtain word code split sequences, and trigger an visual anomaly recognition module;
the visual anomaly recognition module, configured to recognize first sequence number from the word code split sequences and trigger a target file invoking module; and
the target file invoking module, configured to determine whether the word codes are generated on the basis of an encoding mechanism designed by a system, and if the word codes are generated on the basis of an encoding mechanism designed by a system, directly reading same, and performing target file invoking; the word codes are not generated on the basis of an encoding mechanism designed by a system, invoking a preset target file corresponding to the word codes according to the first sequence numbers and second sequence numbers, which are corresponding to the target words;

wherein the first sequence numbers and second sequence numbers are determined through the following process:

sequentially recording sequence numbers of split sequence elements which are visual anomaly processed, the recorded sequence numbers are records as the first sequence numbers;

splicing pronunciations or acronyms of the words corresponding to the target words with the random numbers, so as to generate second sequence numbers.

* * * * *